US007425178B1

(12) United States Patent
Odom

(10) Patent No.: US 7,425,178 B1

(45) **Date of Patent: *Sep. 16, 2008**

(54) LIVE AND ELECTRONIC WAGERING AND LOTTERY GAME

(76) Inventor: Wayne Odom, 549 E. Oakey, Las Vegas, NV (US) 89104

( * ) Notice: Subject to any disclaimer, the term of this patent is extended or adjusted under 35 U.S.C. 154(b) by 44 days.

This patent is subject to a terminal disclaimer.

(21) Appl. No.: 09/942,520

(22) Filed: Aug. 29, 2001

Related U.S. Application Data

(60) Provisional application No. 60/229,665, filed on Aug. 31, 2000.

(51) Int. Cl.

| | |
|---|---|
| ***A63F 1/00*** | (2006.01) |
| ***A63F 1/16*** | (2006.01) |
| ***A63F 13/10*** | (2006.01) |
| ***A63F 3/06*** | (2006.01) |

(52) U.S. Cl. .............................. 463/21; 463/9; 463/16; 463/22; 463/30

(58) Field of Classification Search ................. 273/292, 273/274, 303, 309, 138.1, 149 P, 149 R, 269, 273/270; 463/9–13, 25–28, 11, 16–23, 13.22, 463/30–32; 235/1, 61, 90, 88 G; 283/72, 283/94, 903; 377/4, 5; 434/128, 129; 700/91–93; 340/323 R, 323 B; 116/222; 353/45; 379/93.13
See application file for complete search history.

(56) References Cited

U.S. PATENT DOCUMENTS

| | | | | |
|---|---|---|---|---|
| 5,042,809 | A * | 8/1991 | Richardson | 463/18 |
| 5,324,035 | A * | 6/1994 | Morris et al. | 463/42 |
| 5,630,753 | A * | 5/1997 | Fuchs | 463/9 |
| 5,823,873 | A * | 10/1998 | Moody | 463/13 |
| 5,882,258 | A * | 3/1999 | Kelly et al. | 463/11 |
| 5,967,894 | A * | 10/1999 | Kinoshita et al. | 463/13 |
| 6,062,979 | A * | 5/2000 | Inoue | 463/12 |
| 6,129,631 | A * | 10/2000 | Hundal et al. | 463/11 |
| 6,131,906 | A * | 10/2000 | Green | 273/148 R |
| 6,186,894 | B1 * | 2/2001 | Mayeroff | 463/20 |
| 6,299,531 | B1 * | 10/2001 | Bommarito | 463/12 |
| 6,343,989 | B1 * | 2/2002 | Wood et al. | 463/23 |
| 6,443,456 | B1 * | 9/2002 | Gajor | 273/303 |
| 6,533,658 | B1 * | 3/2003 | Walker et al. | 463/13 |
| 6,537,150 | B1 * | 3/2003 | Luciano et al. | 463/16 |
| 7,056,205 | B2 * | 6/2006 | Odom et al. | 463/13 |
| 2002/0103017 | A1 * | 8/2002 | Odom et al. | 463/13 |
| 2002/0155872 | A1 * | 10/2002 | Odom et al. | 463/13 |
| 2005/0143158 | A1 * | 6/2005 | Odom et al. | 463/13 |

OTHER PUBLICATIONS

"Scarne's Encyclopedia of Card Games," by John Scarne, (c) 1973 HarperCollins, chapters on Poker and Blackjack.*
"Scarne's Encyclopedia of Card Games," by John Scarne, 1973, HarperCollins, New York, N.Y., chapters on poker and blackjack.*

* cited by examiner

*Primary Examiner*—Xuan M. Thai
*Assistant Examiner*—Matthew D. Hoel
(74) *Attorney, Agent, or Firm*—Robert Ryan Morishita; Morishita Law Firm

(57) ABSTRACT

A method and device is set forth for playing a game where an inventory of game indicia is arranged in a random but established, serial order. For each hand of play the player makes a wager and game indicia are displayed in order from the inventory to define a winning or losing outcome. A display, as hands are played, displays the remaining constituency of the inventory and the player, before any game, can order re-shuffling and re-constitute of the inventory.

18 Claims, 7 Drawing Sheets

LIVE AND ELECTRONIC WAGERING AND LOTTERY GAME

CROSS REFERENCE TO RELATED APPLICATION

This application claims benefit to commonly owned application Ser. No. 60/229,665 filed Aug. 31, 2000 and titled "Live and Electronic Wagering and Lottery Game".

FIELD OF THE INVENTION

The present invention relates to a live and electronic wagering or lottery game where an inventory of game symbols are arranged in a random order and distributed to define an outcome for the game.

BACKGROUND

Wagering or casino or lottery games are typically referred to as live games or electronic games. Live games are those such as Poker, Blackjack, Roulette and the like. Electronic games includes games such as Video Poker and electro-mechanical and video based slot machines. For electronic games, a player inputs a wager which can be money, tokens or fictitious credits. Operation of the device produces an outcome, which can be a winning or a losing outcome. For Video Poker, virtual cards are dealt and the player, by holding and discarding cards, attempts to construct a winning hand combination. For each hand of play, the cards are randomly selected from what may be deemed to be a full deck of cards by a random number generator. That is, as hands are sequentially played, the virtual deck is not depleted of the cards that have already been played. After each hand, the game proceeds as though it were being dealt from a freshly shuffled deck.

For slot machines, symbols are randomly selected and presented along one or more pay lines. The combinations of symbols at an enabled pay line determines whether the player has obtained a winning or a losing outcome.

For live games such as Blackjack, cards are dealt from a deck or from a shoe containing multiple decks to players. The players assemble a final hand of cards which is the outcome. In Blackjack the final hand is the sum of the values of the cards according to the well known rules of the game. As hands are dealt the deck or shoe is depleted to a point where the cards are reshuffled. Players can keep track of the cards played and thus know which cards remain in the deck or shoe. This may give them an advantage.

There is a need for a game which has the excitement of a slot machine as well as the anticipation accompanying the deal of cards. There is also the need for a game where the inventory of symbols is depleted as hands are played, like a deck of cards, until the inventory needs to be re-shuffled. There is also a need for an electronic game which permits the player to, after any hand, order re-shuffling of the symbol inventory. There is further a need for an electronic game where the remaining inventory of symbols for play can be displayed for the player to see.

SUMMARY OF THE INVENTION

There is, therefore, set forth according to the present invention a method and device for a game which randomly arranges game symbols into a serial ordered inventory and displays the same in sequence to define one or more outcomes. A display displays the constituency of the inventory as symbols are depleted from the inventory during play. At a prompt by the player or at substantially a predetermined point of exhaustion of the inventory, the inventory is re-constituted and re-shuffled into a random serial order.

The method includes configuring the game inventory indicia into a random, serial order. The player makes wagers and plays each of a series of hands. For each hand of play a predetermined number of game indicia are revealed to define an outcome, said indicia selected in order from the serially arranged inventory. The method further includes displaying the constituency of the inventory depleted of said revealed indicia for each hand as well as issuing an award to a player obtaining one of a plurality of preselected winning indicia combinations.

The device for playing the game includes a processor, said processor configured to include means for randomly arranging an inventory of game symbols or indicia into a serial order and a video display. Means are provided for a player to make a wager and prompt play of the game. The processor, in response to prompting of play, is configured to select and display at said display a predetermined number of indicia selected in order from said arranged inventory to define an outcome. The processor is configured to compare said outcome to a schedule of winning outcomes stored in a data structure and to issue an award for a winning combination. Further, the processor is configured to display the constituency of the remaining symbol inventory.

BRIEF DESCRIPTION OF THE DRAWINGS

These and other features and advantages will become appreciated as the same becomes better understood with reference to the description claims and drawings wherein:

DESCRIPTION

Figure 1:
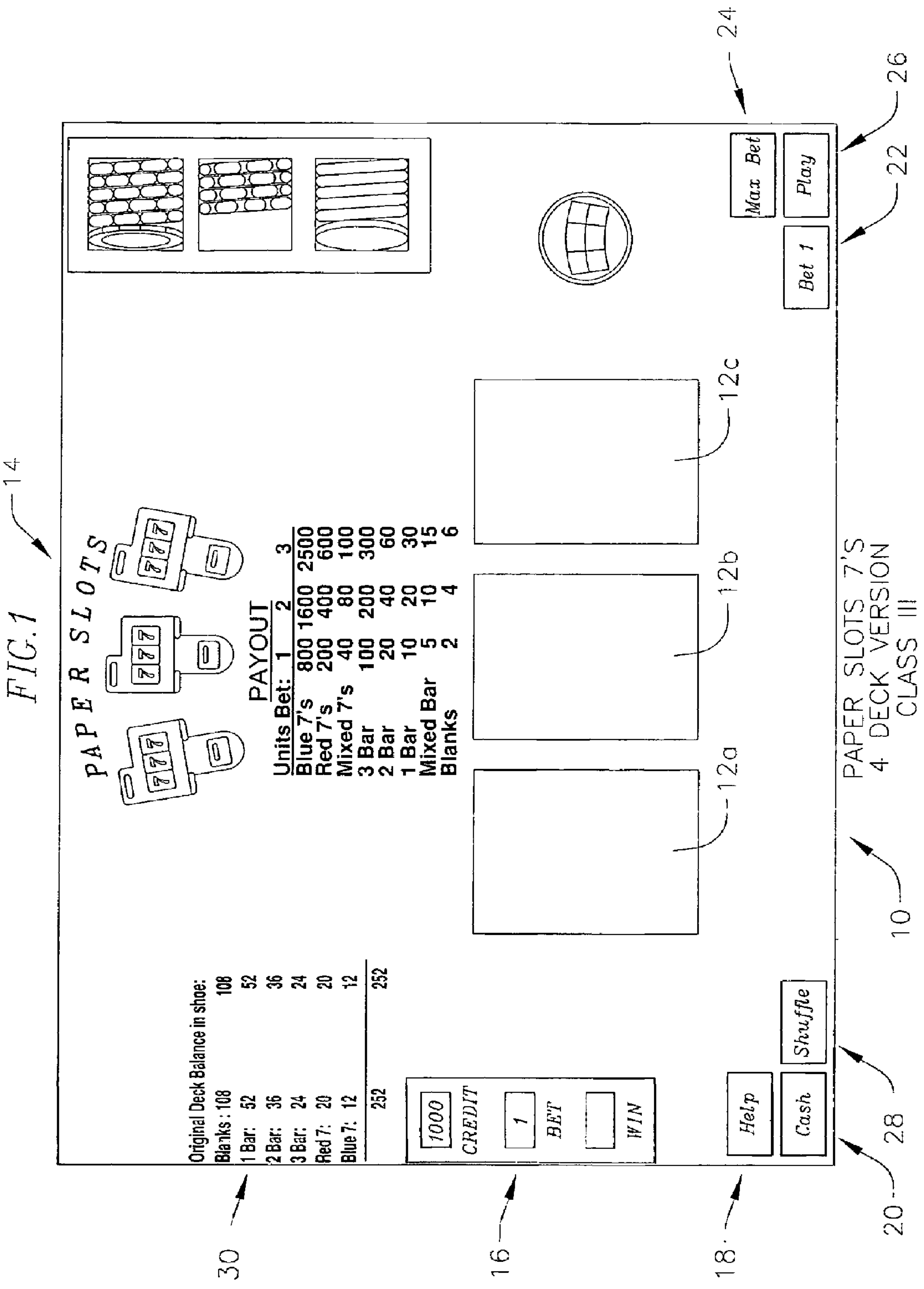
FIG. 1 shows a layout for a screen display for the electronic version before play.

Turning to FIG. 1, a layout 10 for the game according to the present invention is shown for play as displayed for the electronic version of the game. According to this embodiment, the display includes three areas, 12*a* through 12*c*, which, as described below, receive game cards as dealt to produce an outcome for the game. The display may also show a pay schedule 14 as well as a credit meter 16 which reflects the number of credits are available for wagering, the amount wagered on a hand of play and the amount won. There also may be provided various buttons embodied as buttons on the machine or as areas on the display touch screen. These buttons include a help button 18 for the player to receive assistance concerning play, a cash out button 20 to cash out accumulated credits, a bet one credit button 22, max bet button 24 and play button 26. Also provided according to the present invention is a shuffle button 28 the purposes of which will hereinafter become evident.

To play the device, the player makes a wager by inserting coins or tokens or by depressing the bet one credit button 22 or max bet button 24. The placing of a maximum bet will automatically prompt play of the hand, otherwise the player must depress the play button 26 to start play. Upon the start of play, the processor for the machine, from stored data representing an ordered deck or inventory of game cards, selects and displays three cards in areas 12*a* through 12*c*. The game cards certain game cards are as illustrated in FIGS. 3A through 3D. Preferably the virtual deck includes sixty three game cards according to the following distribution:

Distribution of Game Cards

| Symbol | Number in deck |
|---|---|
| "BAR" | 15 |
| "BAR-BAR" | 9 |
| "BAR-BAR-BAR" | 7 |
| Red "7" | 5 |
| Blue "7" | 3 |
| Blank | 24 |
| Total | 63 |

The three cards as selected and displayed represent the outcome for the game. The player wins a payback based preferably based upon the following pay schedule.

Pay Schedule

| Units Bet | 1 | 2 | 3 |
|---|---|---|---|
| 3 Blue 7s | 2000 | 4000 | 6000 |
| 3 Red 7s | 300 | 600 | 900 |
| Mixed 7s | 50 | 100 | 150 |
| 3 BAR-BAR-BAR | 50 | 100 | 150 |
| 3 BAR-BAR | 20 | 40 | 60 |
| 3 BAR | 10 | 20 | 30 |
| Mixed BARs | 5 | 10 | 15 |
| 3 Blanks | 1 | 2 | 3 |

Other pay schedules, symbols and distributions of symbols can be adopted.

Figure 2:
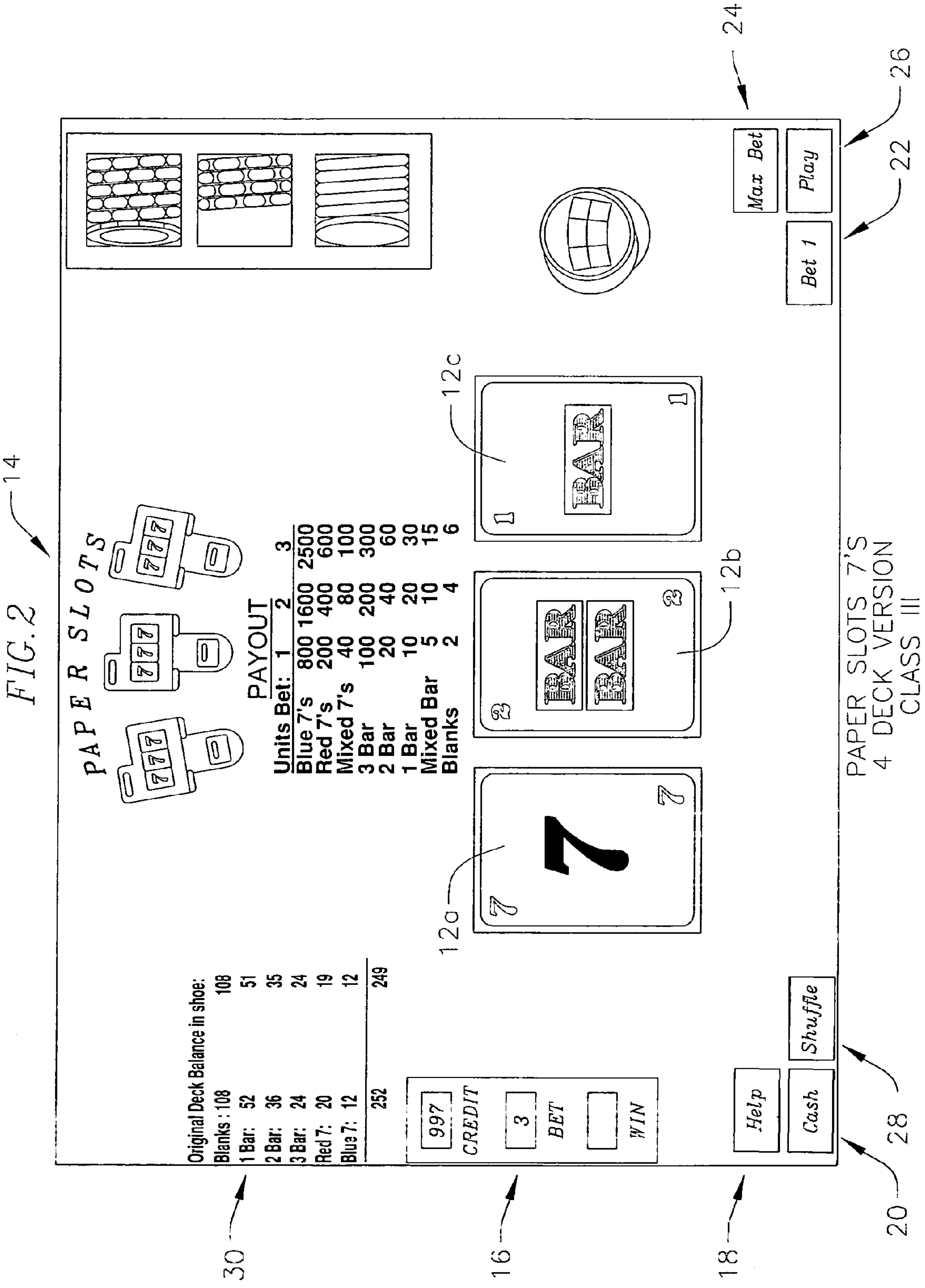
FIG. 2 shows a layout for the screen display for the electronic version after the deal of cards.
Figure 3A:
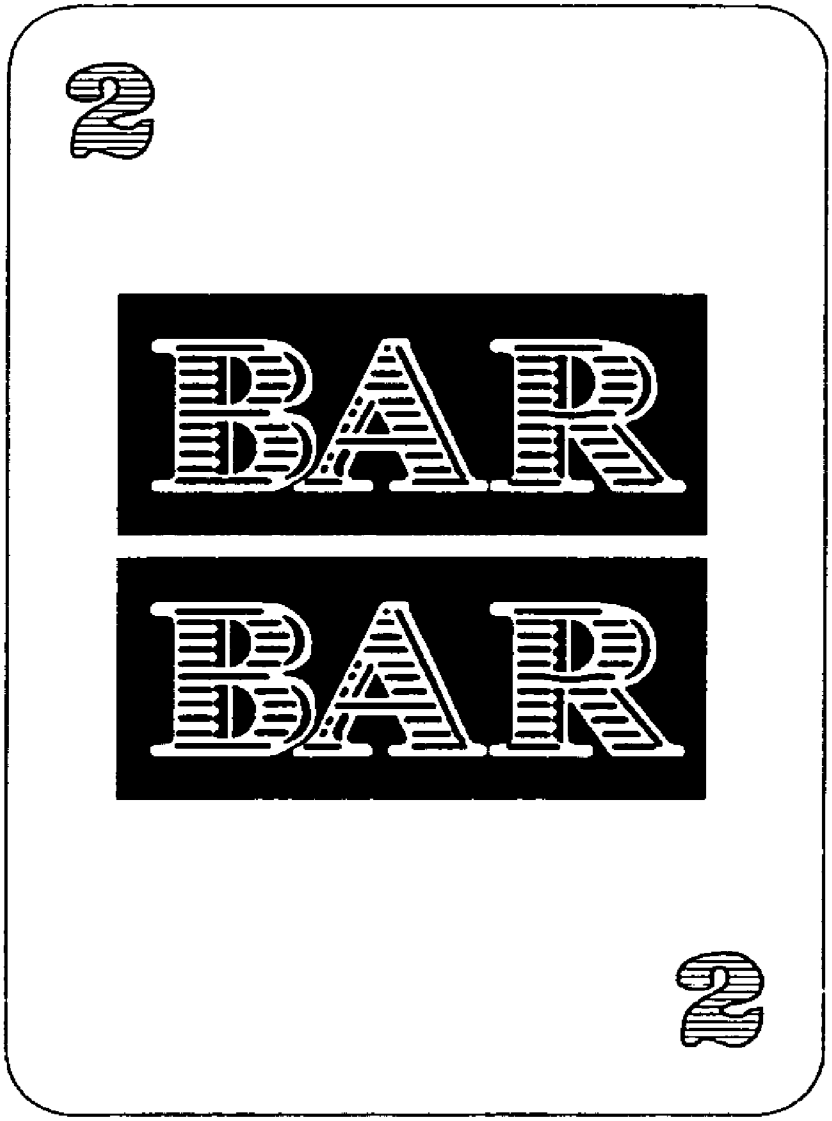
FIGS. 3A through 3D show representations of symbols which may be used for play of the game.
Figure 3B:
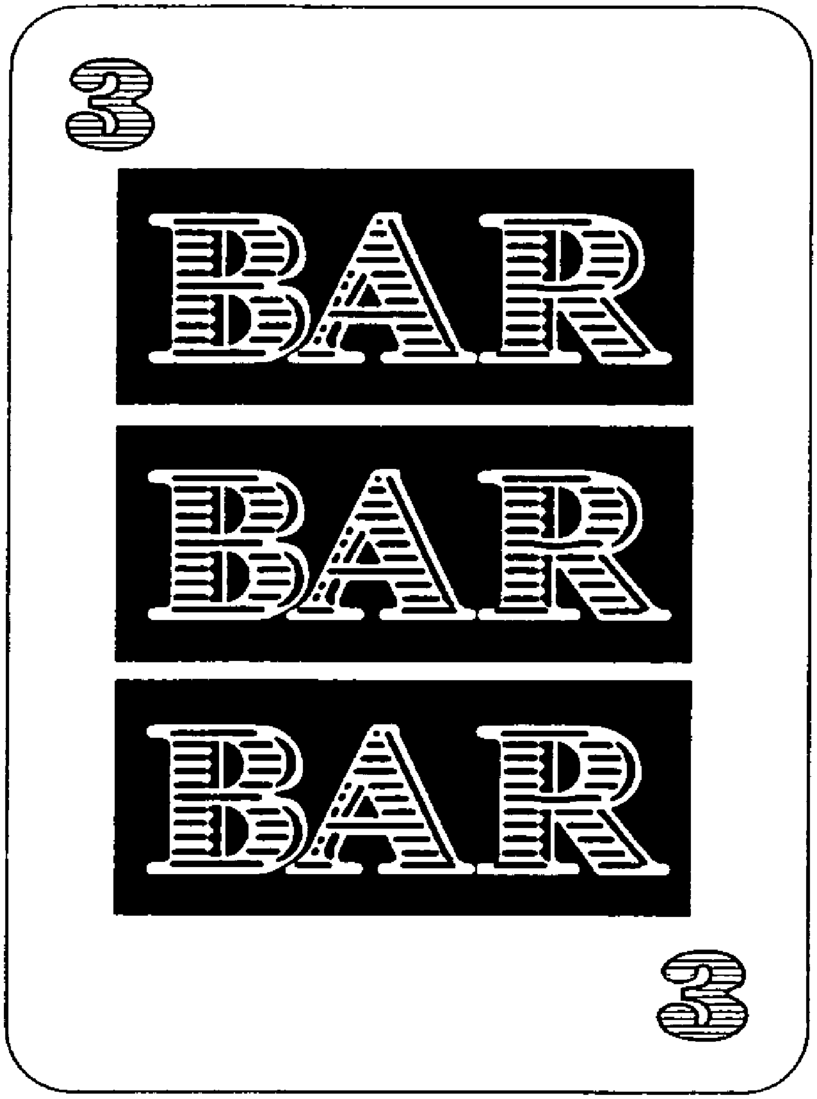
Figure 3C:
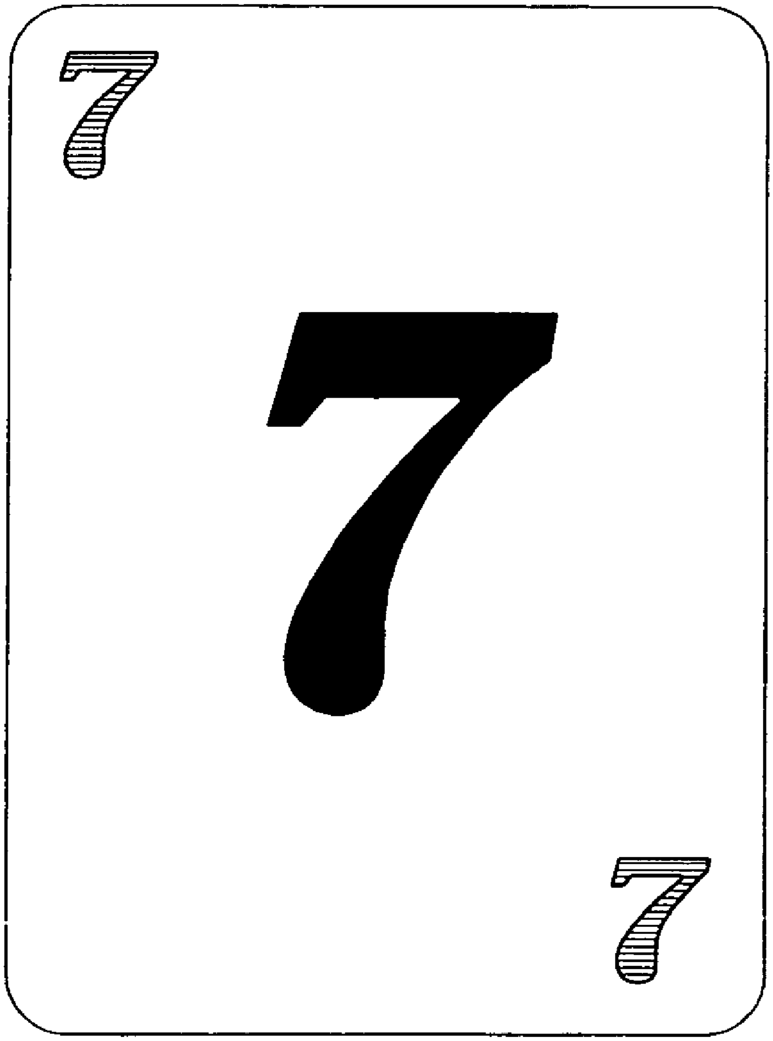
Figure 3D:
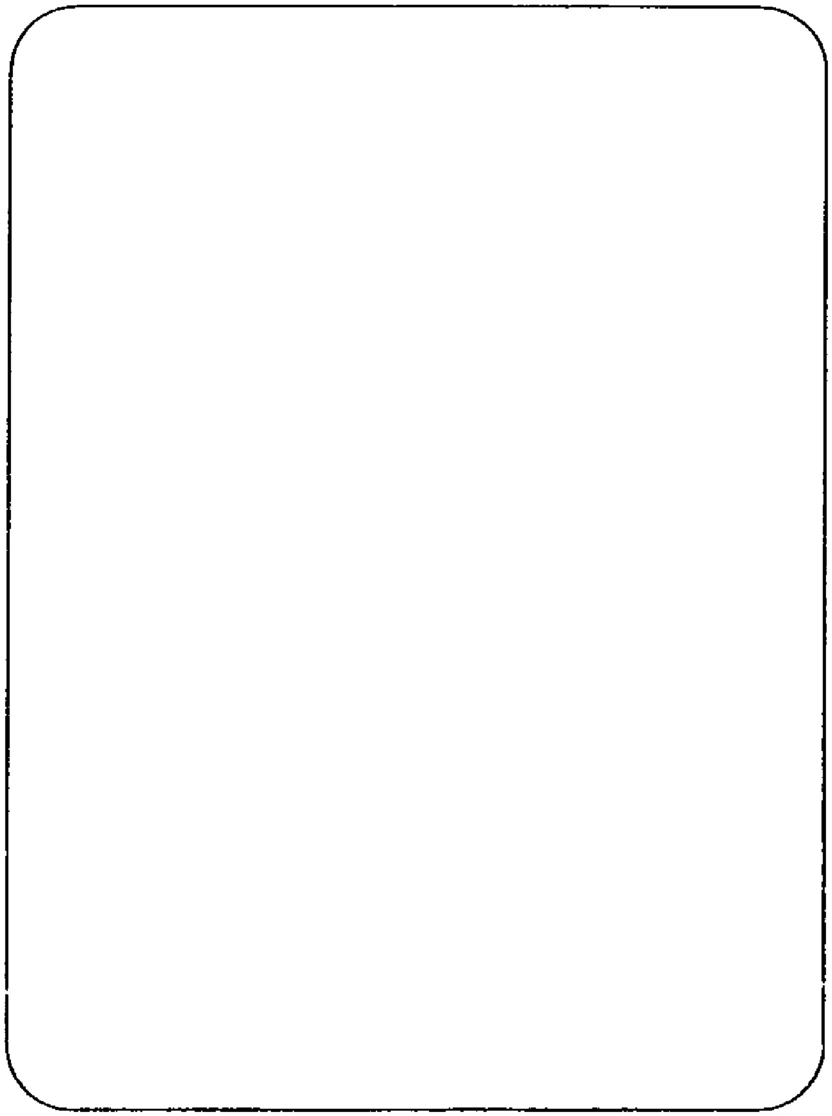

As shown in FIG. 2, the player has not obtained a winning combination since the combination is "7", "BAR-BAR" and "BAR". Thus the player would lose their wager.

To play the next hand, the player inputs another wager and prompts play whereupon the processor would select and display the next three symbols in the ordered data structure representing the deck of game cards.

It should be noted that the data structure of game cards is stored in serial order as determined by a virtual shuffle of game cards. For example, the processor for the game randomly arranges the cards in a serial order 1 through X, where, for the game described herein, X equals 63. As hands are played one after another, the game cards are selected and displayed in the serial order in which they are positioned in the deck. For the first hand cards in positions 1 through 3 would be displayed and removed from the arranged deck. For the next hand the cards would be selected from positions 4 through 6 and so forth until the deck is depleted or reaches a predetermined location in the arrangement proximate the last sequential card. The serial play of hands thus depletes the virtual deck of cards in serial order as cards are selected. When the deck is depleted to, for example, three remaining game cards, the processor reshuffles the deck and places the cards in a new, random serial order. By random serial order what is meant is that, like an actual deck, the cards would be randomized and placed in sequence, 1 through X.

A feature of the present invention is that prior to entering a wager, the player can depress the help button 18 which controls the game processor to display at a deck balance area 30 the constituency of the cards remaining in the deck. For example, if forty cards have been dealt for preceding hands, the balance area would display, for the remaining twenty-three cards, how many Blanks, BARs, BAR-BARs, and 7s remain in the deck. If, for example, all of the Blue 7s have been played thus depriving the player of the ability to have a 3 Blue 7s outcome, the player can depress the shuffle button 28 and the processor will reshuffle and randomize the deck. The ability to see the balance of the deck remaining for play may lead the player to increase their wagers based upon the perception that the probabilities for obtaining a favorable outcome are increased. Further, the ability to reshuffle will also convince the player that the game is fair.

The game can be played with a single virtual deck or multiple virtual decks. Further the game can be played as a video lottery where it is guaranteed that in any particular cycle of hands, that each series of prizes will be awarded. For example, if the cycle is selected as 238,266 hands, the pay outs and frequencies are as set forth below:

238,266 Hands in Cycle

| Symbols | Hits | Payout | Max Bet Total Payout |
|---|---|---|---|
| Blue 7s | 6 | 6000 | 36,000 |
| Red 7s | 60 | 900 | 54,000 |
| Mixed 7s | 270 | 150 | 40,500 |
| BAR-BAR-BAR | 210 | 150 | 31,500 |
| BAR-BAR | 504 | 60 | 30,240 |
| BAR | 2730 | 30 | 81,900 |
| Mixed BARs | 23,536 | 15 | 352,890 |
| Blanks | 12,144 | 3 | 36,432 |
| | 39,450 | | 663,462 |
| Total Play: | | 714,748 | |
| Total Payout: | | −663,462 | |
| Total Hold | | 51,336 (7.18%) | |
| Hit Ratio: | | 1 in 6.04 hands | |

Thus, it is seen that for a lottery based game, the game presents a 7.18% hold. This hold can be increased or decreased by altering the pays for one or more winning combinations or by adding more, or deleting, winning combinations.

For a table game version, a table is provided much like a Blackjack table having, for example, six player positions. At each player position there is provided the areas 12*a* through 12*c* for the players game cards. Each player makes a wager, the minimums and maximums of which may be dictated by house rules. After each player has made their desired wager, a dealer from a single deck of shuffled game cards or a shoe containing multiple, e.g. four, shuffled decks, deals three game cards to each of the player's areas 12*a* through 12*c*. Depending upon the combination of cards, as discussed above, the player wins or loses. After paying each winning player and collecting losing wagers, the players make new wagers and new hands are dealt.

Before the start of dealing from a newly shuffled deck the dealer may discard, i.e. burn, three cards. Alternatively, the dealer may deal until there are three cards left in the deck, and then reshuffle. Dealing from the deck or shoe continues until reshuffling is warranted by there being insufficient cards left in the deck to deal hands of three cards to each player.

For the electronic version of the game, the players have the benefit of having displayed the deck balance and ordering reshuffling.

Figure 4:
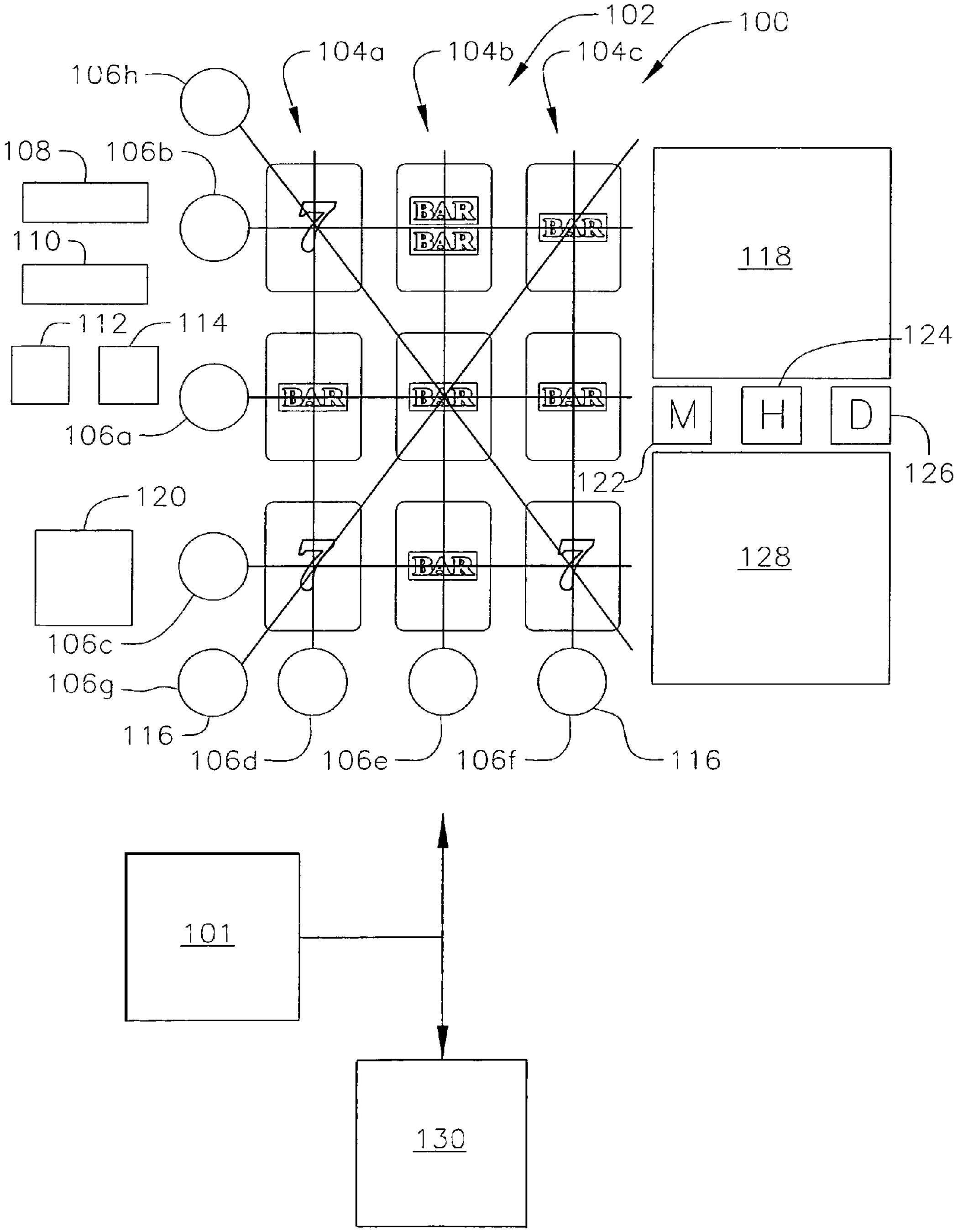
FIG. 4 shows a display for another version of the electronic game.

Turning to FIG. 4 is a further version of the electronic game. In FIG. 4 there is shown and electronic game display 100 controlled by a computer processor 101 to define a three-by-three matrix 102 in the form of a three reel slot machine. Thus the matrix 102 shows three reels 104*a* through 104*c* each having three rows for the display of selected game symbols. The matrix 102 also defines a plurality of pay lines 106*a* through 106*h*, shown as eight which embrace the horizontal rows, the vertical columns formed by the reels 104*a* through 104*c*, and the diagonals. As hereinafter described, game indicia are displayed in the matrix 102 to define outcome for each pay line 106*a* through 106*h*.

The processor also controls the display 100 to display other features for the game. At 108 the display 100 shows the total win for the game or spin whereas at 110 the total amount of credits for gaming are displayed. The total wagered for the last game played is displayed at 112. For a current game, before the spin, the total game wager is displayed at 114.

In regards to game wagers, each pay line 106*a* through 106*h* includes a banner 116 to indicate the amount being wagered on each corresponding pay line 106*a* through 106*h*. For example, if the player wagers three per pay line, each banner 116 would show "3" and the total game wager would be displayed at 114 as "24" (3×8 pay lines).

The display 100 also, according to the present invention, displays at 118 the inventory of symbols remaining for play. For example, where there are 63 symbols, after the initial shuffle the inventory of display would display the following:

| Symbols | Remaining |
|---|---|
| Blue 7s | 3 |
| Red 7s | 5 |
| BAR-BAR-BAR | 7 |
| BAR-BAR | 9 |
| BAR | 15 |
| Blanks | 24 |
| Total | 63 |

As hands or games are played, the inventory display 118 would be depleted based upon the depletion of the symbols from the serial inventory. For example, and with reference to FIG. 4, the inventory would be now shown to be the following (all 7s in FIG. 4 assumed to be Red 7s):

| Symbols | Remaining |
|---|---|
| Blue 7s | 3 |
| Red 7s | 2 |
| BAR-BAR-BAR | 7 |
| BAR-BAR | 8 |
| BAR | 10 |
| Blanks | 24 |

Thus as games are played the player can assess the constituency of the remaining inventory. This feature may alter the wagering decisions of the player, e.g. to increase or decrease the wagers.

In the event the player is dissatisfied with the remaining constituency of the inventory, the player can order the inventory to be re-shuffled by, for example, touching a touch screen button 120. For re-shuffling the inventory is returned to its full symbol inventory, e.g. 63 symbols, and the symbols are randomly shuffled and placed in serial order. Further the inventory display 118 shows a reconstituted, full, inventory.

The display 100, which again may be a touch screen display, includes other features. At 122 a button is presented, the touching of which applies a maximum wager to the game, e.g. 24 units. The wager, as with all wagers, depletes the credit inventory displayed at 110. A help button 124 controls the game processor to display game information to the player. Finally, at 126 there is a deal button 126 which prompts play of a hand.

At 128 the display 100 shows a pay table for winning pay line combinations. The winning combinations would be preselected and stored in a data structure for the processor 101.

| Pay Table | | | |
|---|---|---|---|
| Wager | 1 | 2 | 3 |
| Blue 7s | 3000 | 6000 | 9000 |
| Red 7s | 300 | 600 | 900 |
| Any 7s | 50 | 100 | 150 |
| BAR-BAR-BAR | 50 | 100 | 150 |
| BAR-BAR | 20 | 40 | 60 |
| BAR | 10 | 20 | 30 |
| Any Bar | 5 | 10 | 15 |
| Blanks | 1 | 2 | 3 |

To play the game of FIG. 4, the player wagers on one or more pay lines 106*a* through 106*h*. For purposes of this description it shall be assumed that the player has depressed the maximum wager button 122 to wager 3 units on each pay line 106*a* through 106*h*. The processor is prompted to select nine symbols from the beginning of the serial, random inventory and displays the same in the rows and columns of the game matrix 102 as shown. Based upon the symbols selected and displayed the player has obtained certain winning outcomes as tabulated below (all 7s are Red 7s):

| Pay line | Award |
|---|---|
| 106a | 30 (Three "BARs") |
| 106e | 15 (Three Any "BARs") |
| Total win | 45 |

The award is displayed at 108 and may be issued at 130 in the form of credits, tokens, printed ticket or as otherwise known in the art.

The inventory display 118 would show the displayed symbols removed from the inventory as tabulated above. The player would enter wagers to play the next game. Based upon the displayed inventory, the player may choose before any play to re-shuffle and re-constitute the inventory by touching the re-shuffle button 120. For example, if all of the Red and Blues 7s have been depleted from the inventory, the player would re-shuffle so that the higher award pay outs would be possible.

According to a further embodiment, the game may include "Wild" symbols which are wild to complete any winning outcome. Further the game symbols may be representations of playing cards. The displayed, fully constituted inventory would be, for example, as follows:

| Symbol | Number |
|---|---|
| Wild | 4 |
| Kings | 5 |
| Queens | 6 |
| Jacks | 8 |
| 10s | 10 |
| Blanks | 30 |
| Total | 63 |

Further the pay table for the game may be as follows:

| Pay Table | | | |
|---|---|---|---|
| Wager | 1 | 2 | 3 |
| Wilds | 800 | 1500 | 2500 |
| Kings | 100 | 200 | 300 |
| Queens | 50 | 100 | 150 |
| Jacks | 20 | 40 | 60 |
| 10s | 10 | 20 | 30 |
| Blanks | 1 | 2 | 3 |

Thus the game may use any suitable symbols. Further the game matrix 102 may be expanded to four, five or more reels and may include more or less pay lines.

The game can also be played as a live game where the indicia are put on cards which are dealt to each player from the deck including the card distribution as set forth above. Each player makes a wager and is dealt three cards from the deck which define the outcome. At a predetermined point of penetration into the deck, e.g. 5 rounds of play, the deck is reconstituted and re-shuffled. The player based upon the known distribution of symbols, may also be permitted to order reconstituting and re-shuffling of the deck for the next hand.

While I have shown and described certain embodiments of the present invention, it should be understood that it is subject to many modifications and changes without departing from the spirit and scope of the appended claims.

I claim:

1. A method for conducting a wagering game using an inventory of indicia, said inventory when fully constituted having X number of indicia arranged in sets of at least two indicia each, the method comprising:

receiving a wager from a player to play each of a series of hands;

for each hand of play, randomly selecting and displaying a plurality of individual indicia from the inventory, the combination of indicia selected and displayed defining at least one hand outcome and depleting said selected indicia from play for subsequent hands;

comparing said hand outcome to a predetermined schedule of winning outcomes and if said hand outcome matches one of said schedule of winning outcomes, issuing an award to the player; and prior to play of the next hand displaying the number of each indicia remaining in each indicia set in the inventory as depleted enabling a player to deduce any scheduled winning outcomes eliminated as a result of depletion of said indicia inventory.

2. The method of claim 1 further comprising the player (i) making another wager to play a hand using the depleted inventory or (ii) commanding reconstitution of the inventory to X number of indicia prior to the play of the next hand.

3. The method of claim 1 further comprising reconstitution of the inventory to X number of indicia when a predetermined number of indicia remain in said inventory.

4. The method of claim 1 further comprising randomly selecting and displaying indicia by arranging said indicia into a random, serial order of 1 through X and selecting and displaying said indicia in order from said arranged inventory.

5. An electronic device for conducting a game for a player, said game utilizing an inventory of X number of game indicia arranged in sets of at least two indicia each when said inventory is fully constituted, the device comprising:

a computer processor storing data corresponding to said inventory;

a video display;

means for a player to make a wager and prompt play of the game;

said processor, in response to said prompt, configured to randomly select and display at said display a combination of individual indicia selected from said inventory of indicia, said selected and displayed indicia combination defining at least one outcome, said processor configured to remove said selected indicia from selection for future hands;

said processor configured to compare each outcome to a predetermined schedule of winning outcomes stored in a data structure, to issue an award for each selected and displayed winning outcome, to control the display to display prior to the play of the next hand data corresponding the remaining inventory of indicia sets depleted of said displayed game indicia including the display of data corresponding to the depletion of indicia from said inventory such that a player is enabled to deduce when one or more scheduled winning outcomes are unavailable due to depletion and said processor configured to, for the next hand of play, select indicia from the depleted inventory.

6. The device of claim 5 further comprising input apparatus for the player to input a re-shuffle signal to said processor to prompt the processor to reconstitute said indicia inventory to X number of game indicia.

7. The device of claim 5 further comprising said processor configured to select and display a matrix of indicia, said matrix including a plurality of pay lines each including an outcome, means for the player to wager on a plurality of said pay lines and said processor configured to compare the outcome for each wagered upon pay line to said schedule and to issue an award for each winning combination.

8. The device of claim 5 further comprising said processor configured to arrange said inventory into a random serial order 1 through X, to serially select and display said indicia serially from said arranged inventory.

9. A method for conducting a wagering game using an inventory of indicia, said inventory when fully constituted having X number of individual indicia, the method comprising:

receiving a wager from a player to play each of a series of hands;

for each hand of play, randomly selecting and displaying a plurality of individual indicia from the inventory, the combination of individual indicia selected and displayed defining a winning or losing outcome for the hand and depleting said displayed individual indicia from the inventory available for play of the next hand;

for a winning outcome, issuing an award to the player;

prior to the commencement of the next hand of play displaying to the player information regarding the inventory of depleted indicia such that the player is enabled to deduce any winning outcomes eliminated by said depletion of indicia; and the player making another wager to play a hand using the depleted inventory.

10. The method of claim 9 further comprising reconstituting said inventory to X number of individual indicia when a predetermined number of individual indicia remain in said inventory.

11. The method of claim 9 further comprising randomly selecting and displaying indicia by arranging said indicia into a random, serial order of 1 through X and selecting and displaying said indicia in order from said arranged inventory.

12. A method for conducting a wagering game using an inventory of indicia, said inventory when fully constituted having X number of indicia arranged in indicia sets of at least two indicia each, the method comprising:

receiving a wager from a player to play the game;

arranging the inventory into a random serial order 1 through X;

serially selecting and displaying a plurality of individual indicia from the inventory, the combination of selected and displayed individual indicia defining a winning or losing outcome and depleting said displayed indicia from the inventory available for play of subsequent hands;

for a winning outcome, issuing an award to the player;

prior to play of the next hand displaying to the player the number of each indicia remaining in each indicia set in the inventory as depleted of the prior selected and displayed inventory such that the player is enabled to deduce any winning outcomes eliminated by depletion of the indicia; and the player (i) making another wager to play the game using the depleted inventory or (ii) commanding reconstitution of the inventory to X number of indicia prior to the play of the next game.

13. A method for conducting a wagering game using an inventory of indicia sets, said inventory when fully constituted having X number of indicia, the method comprising:

receiving a wager from a player to play the game;

for each hand of play, randomly selecting and displaying a plurality of indicia from the inventory into the coordinates of a game matrix, the combinations of indicia in the game matrix defining a plurality of winning or losing outcomes and depleting said displayed indicia from the inventory available for play of subsequent hands;

for each winning outcome, issuing an award to the player;

prior to play of a subsequent hand, displaying the number of each indicia remaining in the sets in the inventory as depleted of the prior selected and displayed inventory such that the player is enabled to deduce any winning outcomes eliminated as a result of depletion; and the player opting to (i) make another wager to play a next game using the depleted inventory or (ii) commanding reconstitution of the inventory to X number of indicia prior to the play of the next game.

14. An electronic device for conducting a game for a player, said game utilizing an inventory of X number of game indicia when said inventory is fully constituted, the device comprising:

a computer processor storing an arrangement of said inventory;

a video display;

means for a player to make a wager and prompt play of the game;

said processor, in response to prompting, configured to randomly select and display at said display indicia selected from said inventory of indicia, a hand comprised of a plurality of selected and displayed indicia defining an outcome and to preclude said selected indicia from selection from said inventory;

said processor configured to compare said outcome to a schedule of winning outcomes stored in a data structure, to issue an award for a winning combination and to control the display to display prior to play of a next hand information regarding the inventory of depleted indicia such that a player is enabled to deduce any scheduled winning outcomes eliminated by depletion of said indicia; and means to prompt the processor to reconstitute said indicia inventory to X number of game indicia.

15. The device of claim 14 further comprising said prompting means comprising said processor configured to reconstitute the inventory to X number of game indicia when a predetermined number of indicia remain in said inventory.

16. The device of claim 14 further comprising said prompting means comprising means for a player to input a prompt to the processor to reconstitute the inventory to X number of game indicia.

17. The device of claim 14 further comprising said processor configured to select and display a matrix of indicia, said matrix including a plurality of pay lines each including an outcome, means for the player to wager on a plurality of said pay lines and said processor configured to compare the outcome for each wagered upon pay line to said schedule and to issue an award for each winning combination.

18. The device of claim 17 further comprising said processor configured to arrange said inventory into a random serial order 1 through X, to serially select and display said indicia from said arranged inventory.

* * * * *